United States Patent [19]

Li et al.

[11] 3,733,776
[45] May 22, 1973

[54] LIQUID MEMBRANE ARTIFICIAL LUNG

[75] Inventors: Norman N. Li, Edison; William J. Asher, Fanwood, both of N.J.

[73] Assignee: Esso Research and Engineering Company, Linden, N.J.

[22] Filed: Sept. 16, 1970

[21] Appl. No.: 72,851

[52] U.S. Cl. ..........................55/16, 55/53, 23/258.5, 195/1.8
[51] Int. Cl. ......................B01d 53/22, A61m , C12b
[58] Field of Search............................55/16, 53, 158; 23/258.5; 195/1.8; 210/21, 22; 128/DIG. 3

[56] References Cited

UNITED STATES PATENTS

| 3,410,794 | 11/1968 | Li | 55/16 |
| 3,515,640 | 6/1970 | Rudlin | 195/1.8 |

OTHER PUBLICATIONS

De Filippi et al., Development of a Liquid–Liquid Blood Oxygenator, HEW (NIH), 1969, pp. 381–391.
Pitzele et al., A Liquid–Liquid Oxygenator Utilizing Oxygen Saturated Inert Fluorocarbon for Organ Perfusion Preservation, Surgery, Vol. 68, No. 6, pp. 1079–1086, December, 1970.
CAEN, June 16, 1969, p. 45.

*Primary Examiner*—Charles N. Hart
*Attorney*—Chasan and Sinnock and Michael Conner

[57] ABSTRACT

An artificial lung is created by contacting liquid membrane encapsulated, oxygen containing gas bubbles with blood. The oxygen permeates the membrane rapidly going into the blood. The $CO_2$ initially in the blood permeates the membrane going into the bubble where the initial $CO_2$ partial pressure is lower.

In this manner the blood is oxygenated and $CO_2$ is simultaneously removed.

12 Claims, No Drawings

LIQUID MEMBRANE ARTIFICIAL LUNG

BACKGROUND OF THE INVENTION

This invention pertains to a process for oxygenating mammalian and preferably human blood while simultaneously removing carbon dioxide from the blood. More particularly, this invention pertains to a process for oxygenating human blood and removing carbon dioxide from such blood by contacting the blood with oxygen containing bubbles; said bubbles are coated with a liquid membrane which isolates the blood from gaseous oxygen. The liquid membrane encompass the gas preventing a blood-gas interface while allowing oxygen to diffuse into the blood and allowing the carbon dioxide to diffuse from the blood to the separate gas phase. In a preferred embodiment of the instant invention the membrane is a fluorocarbon or a derivative thereof and encompasses a gas which is substantially oxygen. Fluorocarbon derivatives include those surface active fluorocarbons which are halogenated e.g. chlorinated, except those which are fluorinated, oxygenated e.g. fluoroethers and those which contain metal ions e.g. Na,Mg.

Currently, the incidence of lung disease in the United States is increasing at a very rapid rate. Emphysema and similar diseases in which the body fails to properly oxygenate the blood cause a tremendous strain on the heart and this eventually in many cases leads to premature death. To increase the oxygen within the bloodstream several artificial lungs have been developed. The best commercial artificial lung devices operate by contacting blood directly with oxygen.

Unfortunately, these devices are expensive and have met with limited success. More significantly, they have had the problem of blood hemolysis or the rupture of red blood cells and of the denaturation of proteins in the blood. Proteins consist of up to several million units. These proteins that are soluble in water, or in blood, form colloidal solutions. Fundamental change of their needed characteristic properties can easily occur by surface contacting with oxygen or some non compatible solid surface and also by chemical treatments. Such fundamental change of proteins' characteristic properties is termed denaturation.

Thus a method is needed by means of which blood can be efficiently oxygenated, while $CO_2$ is simultaneously removed from the system, in the absence of denaturation.

SUMMARY OF THE INVENTION

According to this invention it has unexpectedly been found that contacting liquid membrane encapsulated bubbles of oxygen with venous blood will serve to effectively remove the carbon dioxide from the blood and add oxygen to the blood. When this balance is destroyed because of illness or other cause, the patient may lapse into unconsciousness and eventual death. It is obvious that even temporary lack of oxygen will result in permanent damage of brain cells.

To reoxygenate the blood according to the process of the instant invention the following procedure is followed.

Bubbles of oxygen containing gas are formed in the liquid which is to form the liquid membrane. These bubbles are then allowed to migrate to a blood liquid interface. The bubbles then enter the venous blood phase because the bubbles have a lower density compared to blood. When these bubbles enter the blood they have a liquid membrane film around them preventing a damaging blood gas interface. The liquid membrane encapsulated droplets are allowed to move through the blood under the influence of their lower density. As they move through the blood oxygen diffuses through the liquid membrane to the blood thereby oxygenating it. A concomitant diffusion of carbon dioxide from the venous blood to the gas bubble also occurs. Thus the blood is changed from the venous state which is carbon dioxide rich, oxygen depleted to carbon dioxide lean, oxygen replenished with the adjustment of operating parameters be made to match that of arterial blood. This blood is then ready to reenter the patient to support homeostatis.

The liquid membrane incapsulated bubbles move through the blood under the influence of their density difference and agglomerate forming a foam containing very little of any blood. This foam-blood interface effectively prevents a damaging blood-gas interface. With time the bubbles in the foam collapse liberating the gas while in somewhat depleted in oxygen and enhanced in carbon dioxide content. This gas can then be discarded by venting. A separate vessel is normally provided for the collapsing of the foam so the liquid membrane which is the continuous phase of the foam will not on breaking form small droplets that might be admixed with the blood. The continuous phase of the foam after it has collapsed can be collected and reused to make additional liquid membrane.

The venous blood can either be treated on a batch basis or on a continuous basis. When a continuous process is used the blood flow can be primarily downward, countercurrent to rising liquid membrane encapsulated bubbles.

In more detail the instant invention pertains to a method for oxygenating blood and in particular venous blood while removing carbon dioxide from the blood. Venous blood is the blood which is returning to the heart after having transported oxygen to various parts of the body. Thus, the blood has a lower concentration of oxygen than the blood which has been pumped directly from the heart into the arteries. In addition, venous blood has absorbed carbon dioxide from the tissues so the content of carbon dioxide in venous blood is higher than carbon dioxide content of blood within the arteries. Normally, venous blood contains about 53 volume percent of carbon dioxide and about 15 volume percent of oxygen.

In the case of lung disease the oxygen content of the blood has to be enriched since the lungs are not capable of bringing in the desired amount of oxygen which would be in the amount of about 20 volume percent in the arterial blood. Also, carbon dioxide has to be removed to maintain a normal 50 volume percent in the arterial blood. Thus, the instant invention pertains to a system in which additional oxygen is forced into the blood while carbon dioxide is removed. To do this the blood is shunted from the body and passed through a system in which it is oxygenated while carbon dioxide is removed. The system contains gas bubbles, said bubbles being coated with a liquid membrane comprising fluorocarbon or their derivatives and their solvent. Within the bubbles is a gas with a higher oxygen partial pressure than in the venous blood and a low carbon dioxide pressure than in the blood. The membrane allows oxygen to diffuse into the blood and carbon dioxide to diffuse into the bubble.

Advantages of the instant invention are readily apparent: blood denaturation is avoided because the proteins in blood are not in direct contact with bulk oxygen. The presence of a liquid membrane serves as a barrier between blood and oxygen, and oxygen only gets into the blood stream by molecular diffusion through the liquid membrane. The $CO_2$ removal occurs because of the low $CO_2$ partial pressure in the bubble. In addition, the very small bubble size presents a large transfer area for the $O_2$ and $CO_2$ with an accompanying increase in efficiency and rate.

The contacting of the emulsion and the blood may take place in many ways. One way is to contact them in a tower with countercurrent flow. The blood may be the continuous phase and the encapsulated bubbles are dispersed uniformly throughout the blood phase both by the way it is introduced into the column and by the flow existing in the column.

The bubbles collapse into a foam at the top of the column. This foam is transported to a separate vessel where it collapses. The collapsed liquid membrane film can then be recycled and used to make additional membrane.

The surfactants which may be utilized include the long-chain polar surfactants such as the fluorocarbons, and their derivatives, the fluoro hydrocarbons and their derivatives, silicones, and miscellaneous surfactants such as polymeric surfactants. By derivatives it is meant halogenated derivatives, except fluorine; e.g. chlorine, oxygenated derivatives such as ethers and metallic derivatives such as Na and Mg. Any chemical compounds that fulfill the following criteria can be used as a surfactant in this invention:

1. High surface activity — so that gas droplets can be formed when a gas is introduced and mixed with a solution of the surfactant in a fluorocarbon, or its derivative, solvent.

2. Insignificant solubility in water — so that it does not dissolve in any significant amount in either blood or the $CO_2$ absorbent solution.

3. Good compatibility with blood so that blood will not be damaged or poisoned by contacting the liquid membranes it forms.

The most preferred surfactants for the instant invention are the short-chain fluorocarbons which are usually within the carbon number (per molecule) from 5 to 20. There are a variety of such compounds available in the market, notably, those manufactured by 3M Company, such as FC-43 etc., and those manufactured by DuPont and marketed under the name of "Freon" E Series.

Typically, such fluorocarbons have five to 20 carbons, preferably 10 to 15 carbons.

The solvent used for the surfactants is preferably of the fluorocarbon type. It should fulfill not only the three criteria for surfactant but also the following two:

1. High oxygen absorption capacity — so that it can rapidly transfer the oxygen from the bubble to the blood.

2. High carbon dioxide permeability — so that the liquid membrane it forms allows rapid transfer of carbon dioxide from the blood phase to the interior of the bubbles.

Any solvent which fills these criterias may be utilized.

Specific fluorocarbons which are most preferred are the following; fluorinated $C_{14}$ ether, manufactured by DuPont as E-4, perfluorotributyl amine, manufactured by 3M as FC-43 and other fluorocarbon compounds manufactured by 3M such as FC-176, FX-184, etc.

The bubbles are formed by introducing an oxygen containing gas into a solution of fluorocarbons and/or their derivatives at intensive mixing condition or by using high velocity jets of gas. The bubble size formed is between $10^{-1}$ and $5 \times 10^{-3}$ cm preferably between $5 \times 10^{-2}$ and $10^{-2}$ cm.

The partial pressure of oxygen in this gas is between 90 and 1,000 mm Hg. The carbon dioxide pressure of this gas is below 40 mm Hg. Preferably the gas is humidified so that the partial pressure of water in the gas is equal to the water partial pressure of the blood at the temperature it is being oxygenated. The oxygenation may take place between 4° and 40° C preferably between 35° and 40° C.

Next the gas bubbles are allowed to move through the fluorocarbon and/or their derivatives to a blood interface. Here the bubbles move into the blood carrying a liquid membrane surrounding the bubble into the blood phase. The liquid membrane encapsulated droplets move up because of their lower density countercurrent to the downward flowing blood.

The liquid membrane encapsulated bubbles move to the top of the blood phase and coalesce forming a foam. This foam prevents a gas-blood interface on top of the blood. The fluorocarbon which had been the liquid membrane when the bubbles were in the blood phase forms the continuous phase of the foam. Under some operating conditions this foam may include blood in small quantities.

This foam is then transferred to another vessel where it is allowed to break down with time. The rate of break down may be accelerated by such standard technique as ultra sonics if desired. Four phase tend to form in this vessel. The top phase is the spent gas from the oxygenation which has reduced oxygen content and enhanced carbon dioxide content. This gas may be vented. Below the gas phase is the gas in fluorocarbon foam phase. This phase isolates a blood phase collecting below it from the potentially damaging gas phase. This quantity of blood using approved operating procedures will be very small in comparison to the quantity of blood oxygenated in the primary oxygenation zone. This blood which is oxygenated has been protected from a blood-gas interface so it may be recirculated to the patient. The lowest phase is the fluorocarbon solution which can be recycled and used to make liquid membranes again.

Typically the blood which is introduced to the oxygenator has an oxygen partial pressure of 40 mm Hg. and the blood withdrawn 95 mm Hg oxygen partial pressure. Similarly the carbon dioxide partial pressure of the blood introduced is about 46 mm carbon dioxide partial pressure and that withdrawn about 40 mm Hg. carbon dioxide partial pressure.

SPECIFIC EMBODIMENTS

In a specific example of the instant invention blood in the amount of 190 grams was oxygenated at a temperature of 25° C. The fluorocarbon system used was a mixture of 5 wt. percent DuPont E-4 fluorocarbon and 95 wt. percent DuPont FC-43 fluorocarbon. This was introduced to the bottom of a tube and the blood put on top of it. A stainless steel tube with about a 5 mm inside diameter was put into the fluorocarbon phase and oxygen introduced through this orifice at a rate of about 40 cc/min.

Bubbles formed in the fluorocarbon phase and rose into the blood phase carrying an encapsulating liquid membrane with them. The oxygen content of the blood was monitored with a physiological gas analysis with an oxygen electrode manufactured by Beckman Corporation.

The blood oxygen content measured in mm Hg oxygen partial pressure rose rapidly as the experiment proceeded as shown in the table below.

| Time (min.) | $O_2$ Introduced (liters) | $O_2$ Partial Pressure in Blood (mm Hg) at Top of Column |
|---|---|---|
| 0 | 0 | 17.0 |
| 2 | 0.08 | 18.0 |
| 5 | – | 19.2 |
| 10 | 0.31 | 21.0 |
| 12 | 0.38 | 24.5 |
| 14 | 0.46 | 27.0 |
| 17 | 0.59 | 30.5 |
| 22 | 0.63 | 32.4 |
| 37 | 0.88 | 39.0 |
| 43 | 1.10 | 44.0 |
| 47 | 1.30 | 49.5 |
| 58 | 1.84 | 62 |
| 70 | 2.40 | 76 |
| 74 | 2.65 | 84 |
| 85 | 3.10 | 99 |
| 125 | 5.58 | 350 |

Samples of blood were submitted for a hemoglobin in in plasmatest after the experiment was completed. No hemoglobin could be detected in the plasma. In contrast a blank run was made without the fluorocarbon solution bubbling the oxygen directly into the blood which of course formed the damaging blood-gas interface. In this blank run the hemoglobin in plasma increased 8 percent indicating blood damage from the blood-gas interface. The absence of hemoglobin in plasma in the experiment using fluorocarbon indicates the liquid membrane protected the blood preventing red cell breakdown.

In the above experiment using fluorocarbon a foam collected on top of the blood; this foam was allowed to overflow into another container where it broke down with time. The liquids from the collapsed foam were blood and fluorocarbon. The blood weight was only 2 grams showing moderate blood inclusion in the foam even under the arbitrarily shown conditions. The fluorocarbon collected from this foam weighed 15 grams. The collection of fluorocarbon from this position in the apparatus is conclusive proof that a liquid membrane was forming around the bubbles as this is the only way the denser fluorocarbon could get to this elevated position.

What is claimed is:

1. A process for oxygenating mammalian blood which comprises contacting said blood with oxygen containing gas bubbles, said bubbles being coated with a liquid membrane, said membrane permitting the permeation of oxygen into the blood whereby at least a portion of said oxygen passes through said membrane and into said blood, and removing said liquid membrane as a foam comprising gas bubbles coated with said liquid membrane.

2. The process of claim 1 wherein said membrane is a fluorocarbon or a derivative thereof.

3. The process of claim 1 wherein the concentration gradient of the $CO_2$ in the blood is higher than in said bubble and at least a portion of the $CO_2$ in said blood passes into said bubble.

4. The process of claim 3 wherein said membrane is a fluorinated surface active ether.

5. The process of claim 3 wherein said membrane is a $C_5$ to $C_{15}$ fluorocarbon.

6. A process for oxygenating human blood and removing carbon dioxide from said blood which comprises contacting said blood with gas bubbles said bubbles being coated with a liquid surfactant membrane and encompassing oxygen said membrane permitting the passage of oxygen into the bloodstream, maintaining a higher partial pressure of carbon dioxide in said bloodstream than in said bubble whereby oxygen permeates through said membrane into said bloodstream and carbon dioxide permeates into said bubble and removing a foam comprising carbon dioxide enriched bubbles.

7. The process of claim 6 wherein said surfactant is a surface active fluorocarbon.

8. The process of claim 7 wherein said fluorocarbon is a fluorinated surface active ether.

9. The process of claim 7 wherein said fluorocarbon is a $C_5$ to $C_{15}$ fluorocarbon.

10. The process of claim 6 wherein said contacting takes place at a temperature of 4° to 40° C.

11. The process of claim 6 wherein the contact between said blood and said bubbles is countercurrent.

12. A process for oxygenating blood and simultaneously removing carbon dioxide which comprises placing in a blood oxygenating zone, blood having an excess of carbon dioxide and insufficient oxygen dissolved therein, and a liquid membrane forming solution, said liquid membrane forming solution comprising a fluorinated surfactant, and characterized as being immiscible with said blood and of sufficiently higher density than said blood, whereby said blood and said liquid membrane solution form two continuous immiscible phases, said blood being disposed above said liquid membrane forming solution and in contact with said liquid membrane forming solution, and introducing oxygen bubbles into said liquid membrane forming solution at a rate sufficient to form a foam, said foam being characterized as oxygen bubbles surrounded by liquid membranes, said liquid membranes being permeable to both oxygen and carbon dioxide, whereby said foam rises into said blood and oxygen permeates from said foam into said blood and carbon dioxide permeates from said blood into said foam.

* * * * *